(12) United States Patent
Tang et al.

(10) Patent No.: US 12,589,749 B2
(45) Date of Patent: Mar. 31, 2026

(54) POWERTRAIN, CONTROL APPARATUS AND MOTOR CONTROL UNIT

(71) Applicant: Huawei Digital Power Technologies Co., Ltd., Shenzhen (CN)

(72) Inventors: Zhengyi Tang, Shenzhen (CN); Qing Chang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 18/594,529

(22) Filed: Mar. 4, 2024

(65) Prior Publication Data

US 2024/0317236 A1 Sep. 26, 2024

(30) Foreign Application Priority Data

Mar. 6, 2023 (CN) .......................... 202310257600.5

(51) Int. Cl.

| | |
|---|---|
| *B60W 30/194* | (2012.01) |
| *B60L 15/20* | (2006.01) |
| *B60W 10/02* | (2006.01) |
| *B60W 10/08* | (2006.01) |
| *B60W 10/30* | (2006.01) |

(Continued)

(52) U.S. Cl.
CPC .......... *B60W 30/194* (2013.01); *B60L 15/20* (2013.01); *B60W 10/02* (2013.01); *B60W 10/08* (2013.01); *B60W 10/30* (2013.01); *F16H 57/0405* (2013.01); *F16H 57/0436* (2013.01); *F16H 57/0476* (2013.01); *F16H 59/72* (2013.01); *F16H 61/16* (2013.01);

*H02K 7/116* (2013.01); *B60W 2510/107* (2013.01); *B60W 2710/021* (2013.01); *B60W 2710/086* (2013.01); *B60W 2710/30* (2013.01); *F16H 2061/168* (2013.01)

(58) Field of Classification Search
CPC ....................................................... G07C 5/085
See application file for complete search history.

(56) References Cited

U.S. PATENT DOCUMENTS

| | | | | |
|---|---|---|---|---|
| 8,983,696 | B2 * | 3/2015 | Matsubara | ............... H02K 9/19 180/65.265 |
| 10,562,519 | B2 * | 2/2020 | West | ............... B60W 30/18127 |

(Continued)

FOREIGN PATENT DOCUMENTS

| | | |
|---|---|---|
| CN | 103560304 A | 2/2014 |
| CN | 114562352 A | 5/2022 |
| JP | 2015085856 A | 5/2015 |

*Primary Examiner* — Michael A Berns
(74) *Attorney, Agent, or Firm* — Maier & Maier, PLLC

(57) ABSTRACT

A powertrain, a control apparatus, and a motor control unit. The powertrain includes a drive motor and a transmission device. The transmission device disconnects a transmission connection between the drive motor and a wheel based on a result of a comparison between a temperature or a viscosity of a lube oil and a preset parameter value, and a rotational speed of the drive motor varies with the result of the comparison between the temperature or the viscosity of the lube oil and the preset parameter value. The drive motor stirs the lube oil through idling, to make the temperature of the lube oil rise rapidly. The powertrain, the control apparatus and the motor control unit provided can improve fluidity of the lube oil at very low temperatures, so that a lube oil pump can be started smoothly.

20 Claims, 4 Drawing Sheets

(51)  Int. Cl.
    *F16H 57/04*      (2010.01)
    *F16H 59/72*      (2006.01)
    *F16H 61/16*      (2006.01)
    *H02K 7/116*      (2006.01)

(56)           References Cited

U.S. PATENT DOCUMENTS

2013/0151057 A1    6/2013  Matsubara et al.
2023/0353006 A1*  11/2023  Hu ........................... B60L 50/60
2024/0317236 A1*   9/2024  Tang ................... B60W 30/194

* cited by examiner

POWERTRAIN, CONTROL APPARATUS AND MOTOR CONTROL UNIT

CROSS-REFERENCE TO RELATED APPLICATIONS

This application claims priority to Chinese Patent Application No. 202310257600.5, filed on Mar. 6, 2023, which is hereby incorporated by reference in its entirety.

TECHNICAL FIELD

The embodiments relate to the field of electric vehicles, and to a powertrain, a control apparatus, and a motor control unit.

BACKGROUND

Electric vehicles have developed rapidly due to features of environmental protection, cost-effectiveness, and comfort. However, at very low temperatures, normal running of the electric vehicles is greatly affected. At very low temperatures, problems suffered by the electric vehicle in normal running include: a viscosity of a lubrication or lube oil increases at very low temperatures, and consequently a lubricity of the lube oil decreases and a lube oil pump is difficult to be started.

SUMMARY

To resolve a problem that a lubricity of a lubrication or lube oil decreasing and a lube oil pump being difficult to be started in a power system of an electric vehicle at very low temperatures, the embodiments includes a powertrain, a motor control unit, and an electric vehicle.

According to a first aspect, the embodiments provide a powertrain for an electric vehicle. The powertrain includes a drive motor and a transmission device. The drive motor drives a wheel of the electric vehicle through the transmission device, and a transmission structure of the drive motor and a transmission structure of the transmission device are lubricated by using a lube oil. The transmission device disconnects a transmission connection between the drive motor and the wheel based on a result of a comparison between a lube oil parameter value and a preset parameter value, and a rotor of the drive motor rotates. The lube oil parameter includes at least one of a temperature of the lube oil and a viscosity of the lube oil.

At very low temperatures, the temperature of the lube oil of a power system of the electric vehicle decreases rapidly, the viscosity of the lube oil increases sharply, and fluidity decreases sharply, the decrease in fluidity of lube oil flow may lead to a difficulty of starting a lube oil pump. Based on a result of a comparison between the temperature or the viscosity of the lube oil and the preset value, the transmission device of the powertrain provided in the embodiments disconnects the connection between the drive motor and the wheel and adjusts a rotational speed of the drive motor. The transmission device disconnects the connection between the drive motor and the wheel, and rotation of the drive motor does not generate a torque acting on the wheel. In a process of idling of the drive motor, the lube oil in the transmission structure of the drive motor is rapidly stirred. In the process in which the lube oil is stirred, kinetic energy is converted into intrinsic energy, and the temperature rises rapidly. According to the powertrain provided in the embodiments, the temperature of the lube oil rapidly rises at very low temperatures. This helps improve a lubricity of the lube oil and facilitates smooth starting of the lube oil pump at very low temperatures.

In an implementation, the transmission device includes an input shaft, an output shaft, a gear set, and a shifting mechanism, the input shaft is configured to connect to the drive motor, the output shaft is configured to connect to the wheel, and the shifting mechanism is configured to disconnect a transmission connection between the output shaft and the gear set, to disconnect a transmission connection between the transmission device and the wheel.

In an implementation, in response to information indicating that the temperature of the lube oil is less than or equal to a preset temperature value or the viscosity of the lube oil is greater than or equal to a preset viscosity value, the transmission device disconnects the transmission connection between the drive motor and the wheel. A rotational speed of the drive motor decreases as the temperature of the lube oil rises, or the rotational speed of the drive motor decreases as the viscosity of the lube oil decreases.

In a process in which the drive motor performs idling, to heat the lube oil, the rotational speed of the drive motor is positively correlated with a rising rate of the temperature of the lube oil. In other words, a higher rotational speed of the drive motor indicates a higher rising rate of the temperature of the lube oil, a higher speed of the drive motor, and higher energy consumption of the drive motor. To meet a balance between the rising rate of the temperature of the lube oil and the energy consumption, the rotational speed of the drive motor decreases with the rising of the temperature of the lube oil. In other words, in an initial heating stage, the temperature of the lube oil is very low, and in this case, an idling speed of the drive motor is high, and the drive motor performs idling rapidly, to meet a requirement for rapid rising of the temperature of the lube oil. As the temperature of the lube oil rises, the fluidity of the lube oil increases, and the requirement for rapid rising of the temperature of the lube oil is no longer urgent. In this case, the rotational speed of the drive motor gradually decreases, to reduce the energy consumption. Therefore, in this implementation, the balance between the energy consumption and a heating rate of the lube oil is implemented.

In an implementation, in response to the information indicating that the temperature of the lube oil is less than or equal to the preset temperature value or the viscosity of the lube oil is greater than or equal to the preset viscosity value, the transmission device disconnects the transmission connection between the transmission device and the wheel.

When the temperature of the lube oil is less than or equal to the preset value or the viscosity of the lube oil is greater than or equal to the preset value, the fluidity of the lube oil is very poor, the lube oil pump is difficult to be started, the shifting mechanism disconnects the connection between the transmission device and the wheel, and maintains a connection between the transmission device and the drive motor. In this case, when the drive motor rotates, the transmission mechanism in the transmission device rotates with the drive motor, so that the lube oil in the drive motor and the lube oil in the transmission device are stirred to be heated, and the temperature of the lube oil rises rapidly. When the temperature of the lube oil is greater than or equal to the preset value or the viscosity of the lube oil is less than or equal to the preset value, the shifting mechanism disconnects the transmission connection between the drive motor and the transmission device, or the shifting mechanism disconnects the transmission connection between the transmission device and the wheel.

In an implementation, the powertrain includes an oil pump motor, the oil pump motor is configured to drive a lube oil pump, and in response to the information indicating that the temperature of the lube oil is less than or equal to the preset temperature value or the viscosity of the lube oil is greater than or equal to the preset viscosity value, the oil pump motor runs in a locked-rotor state.

In response to the information indicating that the temperature of the lube oil is less than or equal to the preset temperature value or the viscosity of the lube oil is greater than or equal to the preset viscosity value, to improve the heating rate of the lube oil, the oil pump motor runs in the locked-rotor state. The oil pump motor does not output the rotational speed when running in the locked-rotor state. A winding of the oil pump motor generates a large amount of heat, and the heat generated on the winding of the oil pump motor is conducted to the lube oil to heat the lube oil.

Accordingly, in response to the information indicating that the temperature of the lube oil is less than the preset temperature value or the viscosity of the lube oil is greater than the preset viscosity, the transmission device of the powertrain provided in the embodiments disconnects the transmission connection between the drive motor and the wheel, and the rotor of the motor drives the transmission structure of the transmission device to rotate, to stir the lube oil in the transmission device and the drive motor, so that the temperature of the lube oil rises rapidly. The powertrain provided in the embodiments resolves a problem that the fluidity of the lube oil decreases and the lube oil pump is difficult to be started at very low temperatures. In addition, the transmission device of the powertrain provided in the embodiments first disconnects the transmission connection between the drive motor and the wheel, so that the drive motor no longer outputs a torque to the wheel.

According to a second aspect, the embodiments provide a control apparatus for an electric vehicle. The electric vehicle includes a drive motor and a transmission device. The drive motor drives a wheel of the electric vehicle through the transmission device, and a transmission structure of the drive motor and a transmission structure of the transmission device are lubricated by using a lube oil. The control apparatus is configured to: send a control signal based on a result of a comparison between a temperature or a viscosity of the lube oil and a preset parameter value, to control the transmission device to disconnect a transmission connection between the drive motor and the wheel, and control a rotor of the drive motor to rotate.

The control apparatus provided in the embodiments may control, based on the result of the comparison between the temperature or the viscosity of the lube oil and the preset parameter value, a disconnection apparatus to disconnect the connection between the drive motor and the wheel, and control the rotor of the drive motor to rotate. The connection between the drive motor and the wheel is disconnected, and rotation of the drive motor does not generate a torque acting on the wheel. In an idling process of the drive motor, the lube oil in the transmission structure of the drive motor is rapidly stirred. In the process in which the lube oil is stirred, kinetic energy is converted into intrinsic energy, and the temperature rises rapidly.

In an implementation, the control apparatus is configured to: in response to information indicating that a temperature of the lube oil is less than or equal to a preset temperature value or a viscosity of the lube oil is greater than or equal to a preset viscosity value, control the transmission device to disconnect the transmission connection between the drive motor and the wheel.

In an implementation, the control apparatus controls a voltage of the drive current to decrease as the temperature of the lube oil rises, or controls the voltage of the drive current to decrease as the viscosity of the lube oil decreases.

According to the control apparatus provided in the embodiments, the voltage of the drive current is controlled to control the rotational speed of the drive motor to decrease as the temperature of lube oil rises or decrease as the viscosity of the lube oil decreases, so that a balance between rising of the temperature of the lube oil and rotation energy consumption of the drive motor can be implemented.

In an implementation, the control apparatus is configured to: in response to the information indicating that the temperature of the lube oil is less than or equal to the preset temperature value or the viscosity of the lube oil is greater than or equal to the preset viscosity value, control the transmission device to disconnect a transmission connection between the transmission device and the wheel.

In an implementation, the electric vehicle includes an oil pump motor configured to drive a lube oil pump. The control apparatus is configured to: in response to the information indicating that the temperature of the lube oil is less than or equal to the preset temperature value or the viscosity of the lube oil is greater than or equal to the preset viscosity value, output a control signal, to control the oil pump motor to enable a rotational speed of the oil pump motor to be zero and a torque of the oil pump motor to be greater than zero.

In an implementation, the control apparatus is configured to: in response to information indicating that the temperature of the lube oil is greater than or equal to a first preset temperature value, output a control signal to the power module, to control a torque current of the drive current to be zero and an excitation current to be greater than zero.

In an implementation, the control apparatus is configured to: in response to the information indicating that the temperature of the lube oil is greater than or equal to the first preset temperature value, control the power module to output a high-frequency impulse current.

When the temperature of the lube oil rises to be greater than the first preset value, the temperature of the lube oil is high, and the lube oil pump can be started smoothly. However, in this case, the temperature of a power battery of the electric vehicle is low, and a low temperature causes a capacity of the power battery to attenuate. The control apparatus controls the motor control unit to output the drive current to the drive motor, where the drive current enables the torque of the drive motor to be zero and the excitation current of the drive motor to be greater than zero. In this case, the drive motor runs in a locked-rotor state, and heat generated on a winding of the drive motor may be conducted to the power battery. In another implementation, the control apparatus is configured to control the motor control unit to output the high-frequency impulse current. The high-frequency impulse current flows through the inside of the power battery, and joule heat is generated on an internal resistance of the battery, so that the power battery is rapidly heated inside the power battery.

According to a third aspect, the embodiments provide a motor control unit. The motor control unit includes the control apparatus according to the first aspect and a power module, where the power module is configured to output a drive current.

According to a fourth aspect, the embodiments provide an electric vehicle. The electric vehicle includes the powertrain according to the first aspect, includes the control apparatus according to the second aspect, or includes the motor control unit according to the third aspect.

Beneficial effects of the motor control unit provided in the third aspect of the embodiments and beneficial effects of the electric vehicle provided in the fourth aspect of the embodiments are the same as beneficial effects in the first aspect and the second aspect. Details are not described herein again.

DETAILED DESCRIPTION OF EMBODIMENTS

The following describes the solutions in the embodiments in more detail.

Terms used in the following embodiments are merely intended to describe various embodiments, but are not intended as limiting. As used in the embodiments, the singular expressions "one", "a", "the", "the foregoing", "this", and "the one" are intended to include also the plural expression, unless the context expressly indicates the contrary. It should be further understood that the term "and/or" indicates and includes any or all possible combinations of one or more listed items. The term "a plurality of" means two or more.

It should be noted that, in the embodiments and accompanying drawings, terms "first", "second", "third", and the like are intended to distinguish between similar objects but do not necessarily indicate a specific order or sequence. It should be understood that the data used in such a way are interchangeable in proper circumstances, so that embodiments can be implemented in another order than the order illustrated or described herein. In addition, terms "include" and any other variants are intended to cover the nonexclusive inclusion. For example, a process, method, system, product, or server that includes a list of steps or units is not necessarily limited to those expressly listed steps or units, but may include other steps or units not expressly listed or inherent to such a process, method, product, or device.

Figure 1:
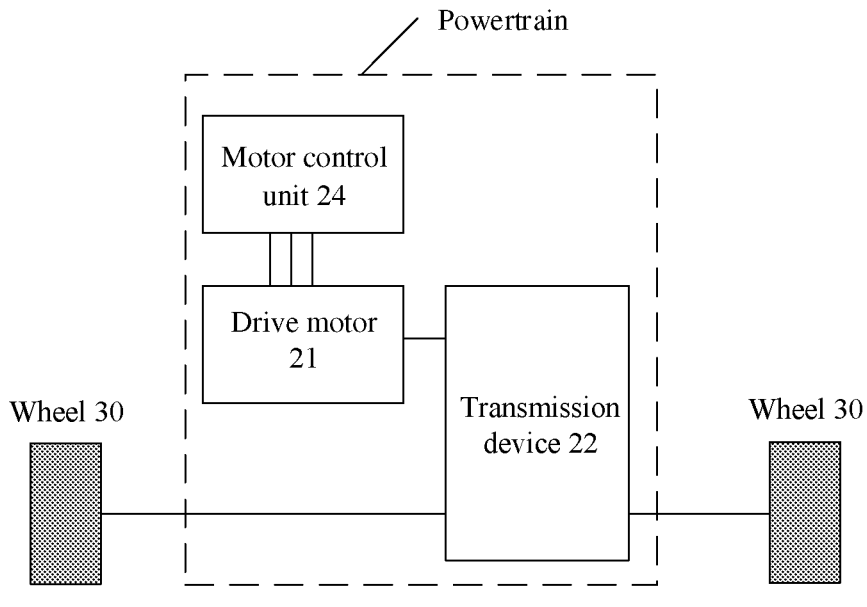
FIG. 1 is a schematic diagram of a power system of an electric vehicle.

FIG. 1 is a schematic diagram of a structure of a power system of a vehicle. The power system includes a powertrain and a wheel. The following further describes each module or component.

The powertrain includes a motor control unit, a drive motor, and a transmission device. There is a connection relationship between the motor control unit (MCU) and the drive motor, there is a connection relationship between the drive motor and the transmission device, and there is a connection relationship between the transmission device and a wheel.

The motor control unit is configured to control the drive motor to output a given torque and rotational speed, to drive the vehicle to drive. The motor control unit can monitor a temperature of the motor control unit, a running temperature and a rotor position of the motor in real time, to keep the motor operating at an ideal temperature.

The drive motor is an apparatus that converts electric energy into mechanical energy, and can output a torque and rotational speed, to provide power for driving of the vehicle.

The transmission device is an apparatus used to change the torque and rotational speed of the drive motor. The transmission device can change a transmission ratio of an output shaft to an input shaft in a fixed or graded manner. Generally, typical transmission devices include a gearbox, a reducer, and the like. For example, the gearbox includes a variable speed transmission mechanism and an operating mechanism, and some vehicles further include a power output mechanism. A common gear transmission is used in most transmission mechanisms, and a planetary gear transmission is used in some transmission mechanisms. A common-gear variable-speed transmission mechanism generally includes a sliding gear and a synchronizer. Generally, a gear controlled by the gearbox can be divided into a forward gear, a reverse gear, and a neutral gear by function. For example, the forward gear is a gear at which the vehicle can be enabled to move forward. The reverse gear is a gear at which the vehicle can be enabled to move backward. When the gearbox is set to be in the neutral gear mode, all gears in the gearbox are not at operating positions. In this case, after power of the drive motor is input to the input shaft, the power is not transmitted to the output shaft. It may be understood as that the torque and the rotational speed generated by the drive motor no longer affect the output shaft.

The wheel is a rigid wheel that fastens an inner edge of a tire, supports the tire, and bears a load together with the tire. The tire, a rim, and a spoke combined together may also be referred to as the wheel. A wheel assembly includes two parts: a wheel and a tire. There is a connection relationship between the wheel and the output shaft of the transmission device. It should be noted that, when the transmission device is in a neutral gear mode, the transmission device no longer inputs the torque and rotational speed to the wheel.

It should be noted that the modules shown in FIG. 1 are merely examples. In an actual application scenario, the power system may further include more or fewer modules or components. This is not limited.

Figure 2:
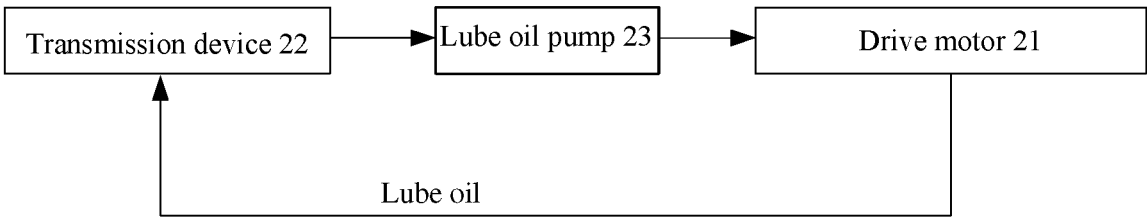
FIG. 2 is a schematic diagram of a lube oil circulation system of a powertrain.

The drive motor and the transmission device have a large quantity of transmission structures, such as gears and shaft bearings. In a running process of the powertrain, to reduce friction between transmission structures of the powertrain in the running process, transmission structures of the drive motor and the transmission device are lubricated by using a lube oil. FIG. 2 shows a lube oil circulation process in the powertrain. As shown in FIG. 2, the lube oil enters the transmission device and the drive motor from an oil pool in the transmission device, to lubricate the transmission structures of the transmission device and the drive motor, and a lube oil pump provides power for a flow process of the lube oil.

A viscosity of the lube oil varies with a temperature. At very low temperatures, the viscosity of the lube oil increases sharply, fluidity of the lube oil decreases sharply, and the decrease in fluidity of the lube oil may lead to a problem like a difficulty of starting the lube oil pump. In view of this, embodiments provide a powertrain, a control apparatus, a motor control unit, and an electric vehicle.

Figure 3:
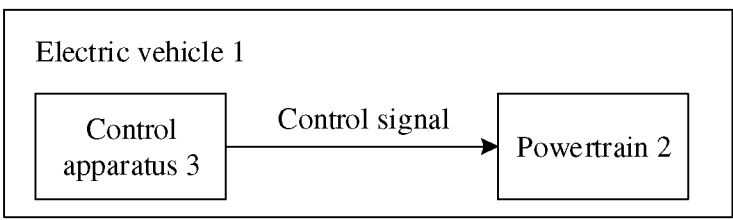
FIG. 3 is a schematic diagram of an electric vehicle according to the embodiments.

FIG. 3 shows an electric vehicle 1 according to an embodiment. The electric vehicle 1 includes a powertrain 2 and a control apparatus 3.

The powertrain 2 is configured to provide power for the electric vehicle 1, and the control apparatus 3 is configured to send a control signal to the powertrain 2, to control the powertrain 2.

Figure 4:
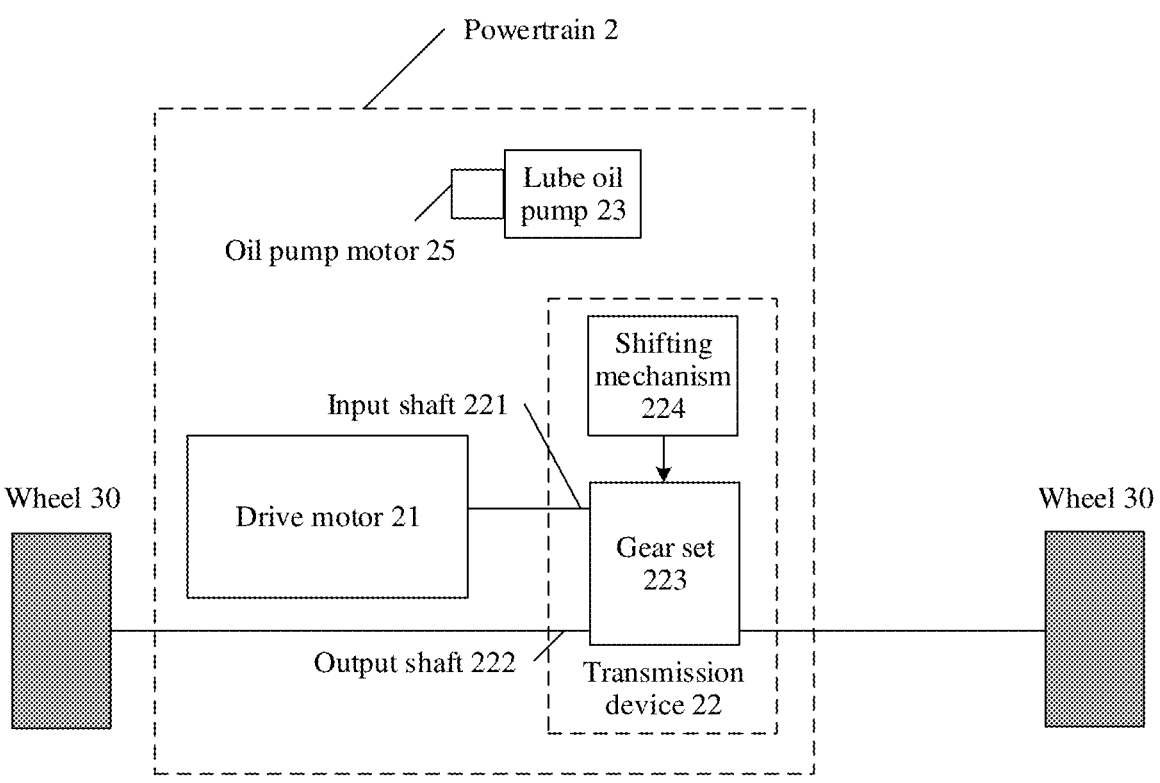
FIG. 4 is a schematic diagram of a powertrain according to the embodiments.

As shown in FIG. 4, the powertrain 2 provided in the embodiments includes a drive motor 21, a transmission device 22, a lube oil pump 23, and an oil pump motor 25. The drive motor 21 drives wheels 30 of the electric vehicle 1 through the transmission device 22. Friction between transmission structures of the drive motor 21 and the transmission device 22 is reduced by using a lube oil. The lube oil pump 23 is configured to provide power for flow of the lube oil. A transmission structure of the drive motor 21 includes a stator, a rotor, a shaft bearing, a gear, and the like. The transmission structure of the transmission device 22 includes a shaft bearing, a gear set, and the like. The transmission device 22 is an apparatus configured to change a torque and a rotational speed from the drive motor 21. For example, in an implementation, the transmission device 22 is a gearbox. In an implementation, the transmission device 22 is a reducer. The transmission device 22 may alternatively be another mechanical apparatus configured to change a transmission ratio of an input shaft 221 to an output shaft 222. The transmission structures of the drive motor 21 and the transmission device 22 are lubricated by using the lube oil. The oil pump motor 25 is configured to drive the lube oil pump 23.

The transmission device 22 provided in this embodiment includes the input shaft 221, the output shaft 222, a gear set 223, and a shifting mechanism 224. The input shaft 221 is configured to connect to the drive motor 21, the output shaft 222 is configured to connect to the wheels 30, and the shifting mechanism 224 is configured to change a running gear of the transmission device 22. Gears of the transmission device 22 include a forward gear, a reverse gear, and a neutral gear. The shifting mechanism 224 enables the transmission device 22 to run in a neutral gear mode, to disconnect a transmission connection between the drive motor 21 and the wheel 30. For example, when the transmission device 22 runs in the neutral gear mode, after power of the drive motor 21 is input to the input shaft 221, the power is no longer transmitted to the output shaft 222. It may be understood as that the torque and rotational speed generated by the drive motor 21 no longer affect the output shaft 222.

As shown in FIG. 4, the drive motor 21 is connected to the wheels 30 through the transmission device 22. It may be understood that, if a transmission connection between the input shaft 221 and the gear set 223 of the transmission device 22 is disconnected or a transmission connection between the output shaft 222 and the gear set 223 of the transmission device 22 is disconnected, the connection between the drive motor 21 and the wheel 30 is disconnected. Therefore, the shifting mechanism 224 may disconnect the transmission connection between the drive motor 21 and the wheel 30 in different manners. In an implementation, the shifting mechanism 224 disconnects the transmission connection between the input shaft 221 and the gear set 223, to disconnect the transmission connection between the drive motor 21 and the transmission device 22. In this case, when the drive motor 21 runs, the transmission structure in the transmission device 22 does not rotate with rotation of the input shaft. In an implementation, the shifting mechanism 224 disconnects the transmission connection between the output shaft 222 and the gear set 223, to disconnect a transmission connection between the transmission device 22 and the wheel. In this case, when the drive motor 21 runs, the transmission structure in the transmission device 22 rotates with rotation of the input shaft 221.

The control apparatus 3 is configured to output a control signal, to control the motor control unit 24, the transmission device 22, and the oil pump motor 25. The motor control unit 24 includes a power module 241. The power module 241 is configured to: receive the control signal output by the control apparatus 3 and output a drive current to the drive motor 21, to control a running state of the drive motor 21. For example, the control apparatus 3 controls the rotational speed of the drive motor 21 by controlling a voltage of the drive current output by the power module 241. A higher voltage of the drive current of the drive motor 21 indicates a higher rotational speed of the drive motor 21. In addition, the control apparatus 3 may output a control signal, to control operating states of the transmission device 22 and the oil pump motor 25. In an implementation, the control apparatus 3 outputs a control signal, to control the transmission device 22 to disconnect the transmission connection between the drive motor 21 and the wheel 30. In an implementation, the control apparatus 3 outputs a control signal, to control a start/stop state or a rotational speed of the oil pump motor 25.

Figure 5:
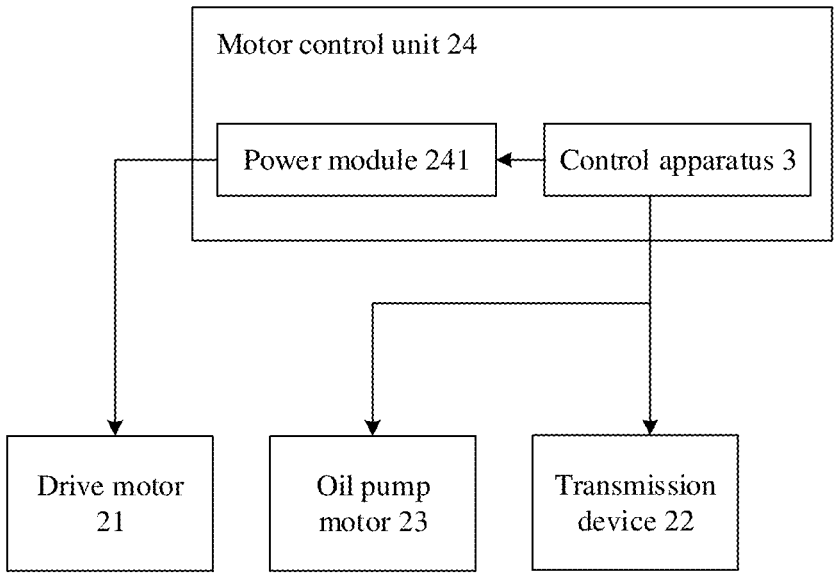
FIG. 5 is a schematic diagram of a control apparatus according to the embodiments.
Figures 6, 7:
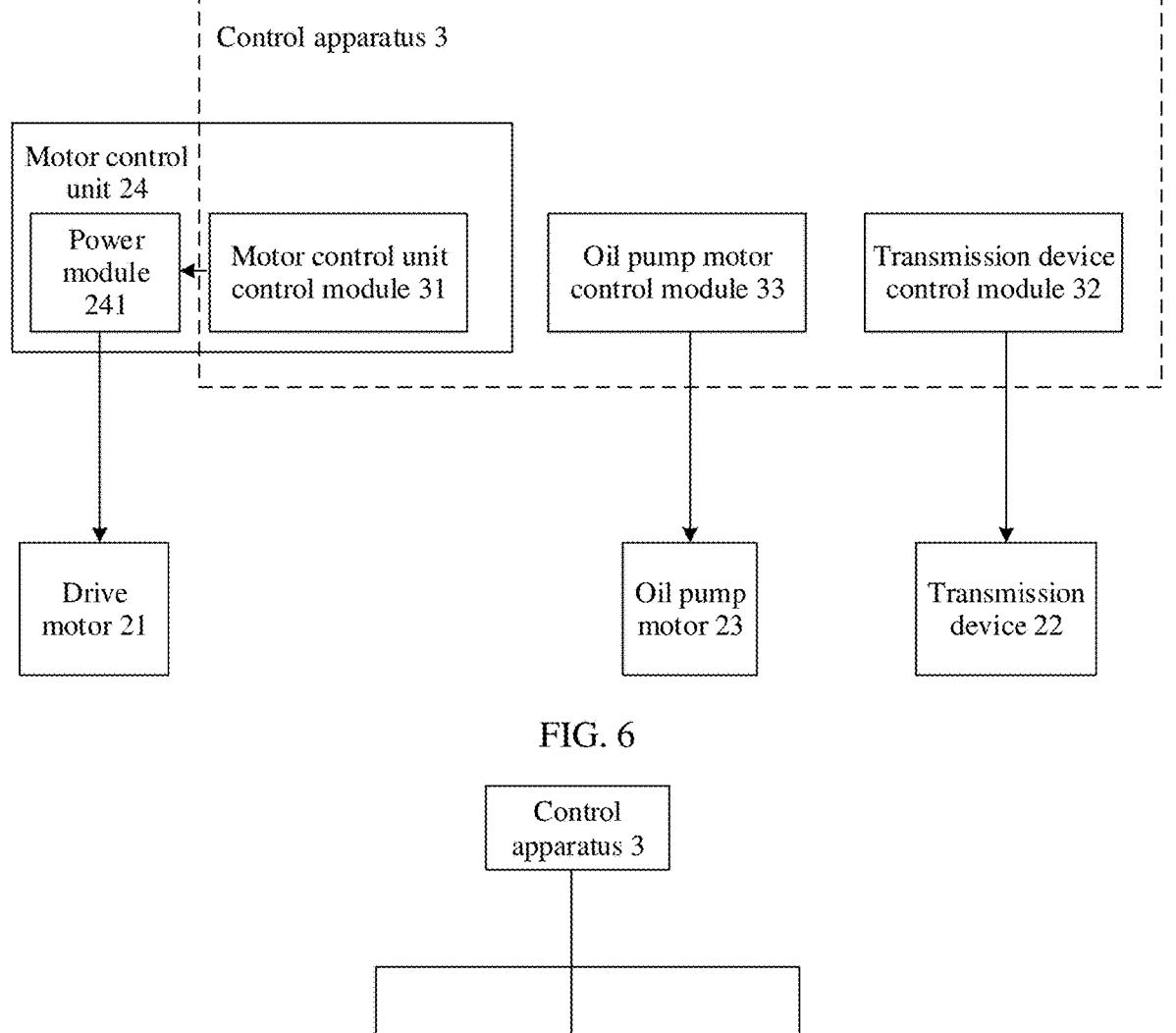
FIG. 6 is another schematic diagram of a control apparatus according to the embodiments.
FIG. 7 is another schematic diagram of a control apparatus according to the embodiments.

The control apparatus provided in this embodiment may be arranged in different manners. In an implementation, as shown in FIG. 5, the control apparatus 3 is integrated in the motor control unit 24. The control apparatus 3 is a part of a control circuit of the motor control unit. In an implementation, as shown in FIG. 6, the control apparatus 3 may be divided into different modules based on different functions. The control apparatus 3 includes a motor control unit control module 31, a transmission device control module 32, and an oil pump motor control module 33. The motor control unit control module is integrated into the motor control unit 24, and the control module of the transmission device 22 and the control module of an oil pump motor 23 are integrated into a vehicle control unit, a domain controller, or another type of electric vehicle component. In an implementation, the control apparatus 3 exists independently as an electronic component in the electric vehicle 1.

At very low temperatures, a low temperature causes a viscosity of the lube oil to increase, and when the viscosity of the lube oil increases, the lube oil pump 23 is difficult to be started. To resolve this problem, the powertrain 2 provided in this embodiment may disconnect the transmission connection between the drive motor 21 and the wheel 30 based on a result of a comparison between a lube oil parameter value and a preset parameter value, the rotor of the drive motor 21 rotates, and transmission mechanisms of the drive motor 21 and the transmission device 22 rotate to stir the lube oil of the drive motor 21 and the transmission device 22. Kinetic energy generated by the transmission mechanisms is converted into heat energy, so that a temperature of the lube oil rapidly rises. The lube oil parameter includes the viscosity of the lube oil, the temperature of the lube oil, or another parameter that can represent the fluidity of the lube oil.

In an embodiment, in response to information indicating that the temperature of the lube oil is less than or equal to a preset temperature value or the viscosity of the lube oil is greater than or equal to a preset viscosity value, the transmission device 22 disconnects the transmission connection between the drive motor 21 and the wheel 30. The rotational speed of the drive motor 21 decreases as the temperature of the lube oil rises or the rotational speed of the drive motor 21 decreases as the viscosity of the lube oil decreases.

When the temperature of the lube oil is less than or equal to the preset temperature value or the viscosity of the lube oil is greater than or equal to the preset viscosity value, the fluidity of the lube oil is poor, a lubricity of the lube oil decreases, and the fluidity of the lube oil decreases, which causes a difficulty of starting the lube oil pump 23. In this case, the transmission device 22 disconnects the transmission connection between the drive motor 21 and the wheel 30. The rotor of the drive motor 21 rotates, and the transmission structures of the drive motor 21 and the transmission device 22 rotate to stir the lube oil, so that the temperature of the lube oil rises rapidly, and the fluidity of the lube oil also increases with the rising of the temperature of the lube oil. However, after the connection between the drive motor 21 and the wheel 30 is disconnected, the rotor of the drive motor 21 and the wheel 30 no longer have a constraint relationship, and rotation of the drive motor 21 does not drive the wheel 30 to rotate, to avoid vibration and noise caused by the torque generated by the drive motor 21 on the wheel 30.

It may be understood that, in a process in which the transmission structure of the drive motor 21 or the transmission device 22 rotates to stir to heat the lube oil, an idling speed of the drive motor 21 is positively correlated with a rising rate of the temperature of the lube oil. A higher rotational speed of the drive motor 21 indicates greater rotational kinetic energy of the transmission structure of the drive motor 21 or the transmission device 22, greater intrinsic energy absorbed by the lube oil, and a higher rising rate of the temperature of the lube oil. However, in this case, a higher idling speed of the drive motor 21 indicates higher energy consumption of the drive motor 21. To meet a balance between the rising rate of the temperature of the lube oil and the energy consumption, the rotational speed of the drive motor 21 decreases with the rising of the temperature of the lube oil. In other words, in an initial heating stage, the temperature of the lube oil is very low, and in this case, the idling speed of the drive motor 21 is high, to meet a requirement for rapid rising of the temperature of the lube oil. As the temperature of the lube oil rises, the fluidity of the lube oil increases, and a requirement for rapid rising of the temperature of the lube oil is no longer urgent. In this case, the rotational speed of the drive motor 21 gradually decreases, to reduce the energy consumption. The powertrain 2 provided in the embodiments controls a relationship between the idling speed of the drive motor 21 and the temperature of the lube oil or the viscosity of the lube oil, so that the temperature of the lube oil rises rapidly at very low temperatures, and the energy consumption of the drive motor 21 during idling is small.

In response to the information indicating that the temperature of the lube oil is less than or equal to the preset temperature value or the viscosity of the lube oil is greater than or equal to the preset viscosity value, the transmission device 22 disconnects the transmission connection between the transmission device 22 and the wheel 30. The temperature of the lube oil is less than or equal to the preset temperature value, or the viscosity of the lube oil is greater than or equal to the preset viscosity value, and the fluidity of the lube oil is very poor. In this case, the lube oil needs to be rapidly heated. The transmission device 22 disconnects the transmission connection between the transmission device 22 and the wheel. In this case, the transmission structure in the transmission device 22 rotates together when the drive motor 21 performs idling, and the drive motor 21 and the transmission device 22 jointly stir the lube oil, so that the temperature of the lube oil rises rapidly.

For example, the preset temperature value is −30° C. When the temperature of the lube oil is less than −30° C., it is difficult to start the lube oil pump. The transmission device 22 disconnects the transmission connection between the transmission device 22 and the wheel 30, and the drive motor 21 performs idling. The transmission structure of the transmission device 22 rotates with the rotor of the drive motor 21, and the lube oil in the drive motor 21 and the transmission device 22 is stirred to heat up.

In a scenario in which the lube oil needs to be heated at a fast speed, the powertrain 2 provided in the embodiments may alternatively heat the lube oil through locked-rotor heating of the oil pump motor 23. Locked-rotor of a motor is a case in which the motor still outputs a torque when a rotational speed is zero. In this case, a large locked-rotor current pass through a winding of the motor, to generate a large amount of heat.

In response to the information indicating that the temperature of the lube oil is less than or equal to the preset temperature value or the viscosity of the lube oil is greater than or equal to the preset viscosity value, the oil pump motor 25 runs in a locked-rotor state, and the oil pump motor 25 generates a large amount of heat through locked-rotor, to heat the lube oil in the lube oil pump 23. The oil pump motor 23 in the powertrain 2 heats the lube oil through locked-rotor, which can further improve a heating rate of the lube oil.

FIG. 7 is a schematic diagram of a control apparatus 3 according to the embodiments. The control apparatus 3 sends, based on a result of a comparison between the temperature of the lube oil or the viscosity of the lube oil and the preset parameter value, a control signal, to control the transmission device 22 to disconnect the transmission connection between the drive motor 21 and the wheel 30. The control apparatus 3 sends a control signal, to control the voltage of the drive current output by the power module 241 to the drive motor 21, so as to control the rotational speed of the drive motor 21. For example, a higher voltage of the drive current of the drive motor 21 indicates a higher rotational speed of the drive motor 21.

In an implementation, the control apparatus 3 outputs, in response to the information indicating that the temperature of the lube oil is less than or equal to the preset temperature value or the viscosity of the lube oil is greater than or equal to the preset viscosity value, a control signal, to control the transmission device 22 to disconnect the transmission connection between the drive motor 21 and the wheel 30 and control the rotor of the drive motor 21 to rotate. For example, the control apparatus 3 outputs a control signal to the power module of the motor control unit 24, and the power module of the motor control unit 24 sends the drive current to the drive motor 21, so that the rotor of the drive motor 21 rotates. The rotor of the drive motor 21 rotates to drive the transmission structure in the transmission device 22 to rotate, so that the lube oil in the drive motor 21 and the transmission device 22 is stirred, and the temperature of the lube oil rises.

In an implementation, the control apparatus 3 controls the voltage of the drive current output by the power module 241 to decrease as the temperature of the lube oil rises or decrease as the viscosity of the lube oil decreases. The connection between the drive motor 21 and the wheel is disconnected, and rotation of the drive motor 21 does not generate a torque acting on the wheel. In an idling process of the drive motor 21, the lube oil in the transmission structure of the drive motor 21 is rapidly stirred. In the process in which the lube oil is stirred, kinetic energy is converted into intrinsic energy, and the temperature rises rapidly. The control apparatus 3 controls, by controlling the voltage of the drive current of the drive motor 21, the rotational speed of the drive motor 21 to decrease as the temperature of the lube oil rises or decrease as the viscosity of the lube oil decreases, to reduce the energy consumption, which is as described above.

In an implementation, the control apparatus 3 sends, in response to the information indicating that the temperature of the lube oil is less than or equal to the preset temperature value or the viscosity of the lube oil is greater than or equal to the preset viscosity value, a control signal to the transmission device 22, to control the transmission device 22 to disconnect the connection between the transmission device 22 and the wheel 30, and sends a control signal to the power module 241, so that the power module 241 outputs the drive current to the drive motor 21 to enable the stator of the drive motor 21 to rotate. The transmission structure of the drive motor 21 and the transmission structure of the transmission device 22 stir the lube oil, so that the temperature of the lube oil rises.

In an implementation, the control apparatus 3 outputs, in response to the information indicating that the temperature of the lube oil is less than or equal to the preset temperature value or the viscosity of the lube oil is greater than or equal to the preset viscosity value, a control signal to the oil pump motor 23, to control a drive current of the oil pump motor 23, where the drive current of the oil pump motor 23 enables a torque of the oil pump motor 23 to be zero and an excitation current of the oil pump motor 23 to be greater than zero. In this case, the oil pump motor 23 runs in the locked-rotor state, the oil pump motor 23 outputs only the torque but does not output the rotational speed, and the oil pump motor 23 running in the locked-rotor state generates a large amount of heat to heat the lube oil in the oil pump.

When the temperature of the lube oil rises to be greater than a first preset value, the temperature of the lube oil is high, and the lube oil pump can be started smoothly. In this case, because an ambient temperature is low, a temperature of a power battery 4 of the electric vehicle is also low. If the power battery 4 runs in a low temperature state, a capacity of the power battery 4 may attenuate. To enable the electric vehicle 1 to run smoothly, the power battery 4 still needs to be heated, so that the power battery 4 runs in an optimal temperature range. Based on this, the control apparatus 3 provided in the embodiments controls the power module 241 to output different types of currents, to heat the power battery 4.

In an implementation, the control apparatus 3 controls, in response to information indicating that the temperature of the lube oil is greater than or equal to the first preset temperature value, the power module 241 to output the drive current to the drive motor 21, where a torque current of the drive motor 21 is zero and an excitation current of the drive motor 21 is greater than zero. In this case, the drive motor 21 outputs only the torque but does not output the rotational speed, the drive motor 21 runs in the locked-rotor state, and heat generated on the winding of the drive motor 21 may be conducted to the power battery 4.

Figure 8:
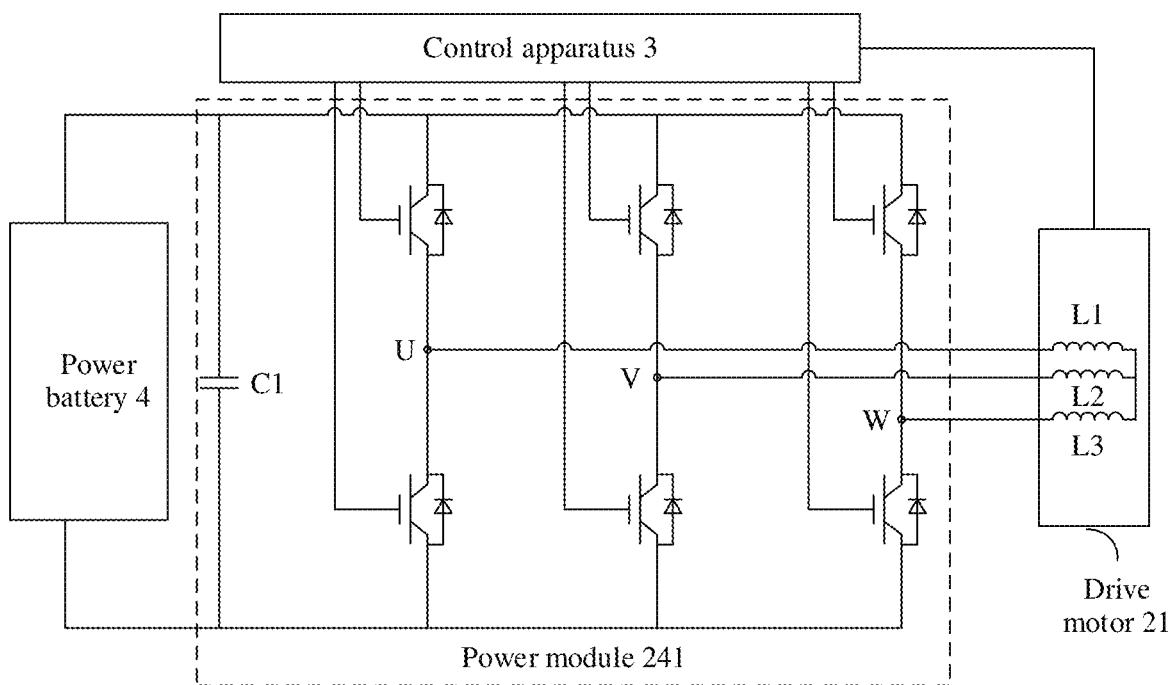
FIG. 8 is another schematic diagram of a control apparatus according to the embodiments.

In an implementation, the control apparatus 3 is configured to: in response to information indicating that the temperature of the lube oil is greater than or equal to a first preset temperature value, control the power module 241 to output a high-frequency impulse current. The high-frequency impulse current is a current whose current intensity changes rapidly. The high-frequency impulse current flows through the inside of the power battery 4, and joule heat is generated on an internal resistance of the power battery 4, so that the power battery 4 is rapidly heated inside the power battery 4. For example, as shown in FIG. 8, the control apparatus 3 outputs a control signal, to control a switching frequency and a duty cycle of each switching transistor of the power module 241, so that the power module 241 outputs the high-frequency impulse current.

In an implementation, the control apparatus 3 controls, in response to information indicating that the temperature of the lube oil is greater than or equal to a first preset temperature value and a temperature of the power battery is less than a second preset temperature value, the power module 241 to output the drive current to the drive motor 21, where a torque current of the drive current is zero and an excitation current is greater than zero. In this case, the drive motor 21 outputs only the torque but does not output the rotational speed, the drive motor 21 runs in the locked-rotor state, and heat generated on the winding of the drive motor 21 may be conducted to the power battery 4 through a heat conduction apparatus located between the power battery 4 and the drive motor 21.

In an implementation, the control apparatus 3 is configured to: in response to information indicating that the temperature of the lube oil is greater than or equal to a first preset temperature value and the temperature of the power battery is less than a second preset temperature value, control the power module 241 to output a high-frequency impulse current. The high-frequency impulse current flows through the inside of the power battery 4, and joule heat is generated on an internal resistance of the power battery 4, so that the power battery 4 is rapidly heated inside the power battery 4.

For example, the first preset temperature value is $-10°$ C., and the second preset temperature value is $5°$ C.

A person of ordinary skill in the art may understand that various numerical numbers such as the first, the second, and the like in the embodiments are merely distinguished for ease of description, and are not intended to limit a scope and a sequence of embodiments. Execution sequences of processes should be determined based on functions and internal logic of the processes.

A person of ordinary skill in the art may be aware that, in combination with the examples described in the embodiments, modules may be implemented by electronic hardware or a combination of computer software and electronic hardware. Whether the functions are performed by hardware or software depends on particular applications and design constraint conditions of the solutions. A person skilled in the art may use different methods to implement the described functions for each specific application, but such implementation should not be considered beyond the scope of the embodiments.

What is claimed is:

1. A powertrain for an electric vehicle, comprising:
a drive motor; and
a transmission device, wherein the drive motor drives a wheel of the electric vehicle through the transmission device, and a transmission structure of the drive motor and a transmission structure of the transmission device are lubricated by using a lube oil;
the transmission device disconnects a transmission connection between the drive motor and the wheel based on a result of a comparison between a lube oil parameter value and a preset parameter value, and a rotor of the drive motor rotates; and the lube oil parameter comprises at least one of a temperature of the lube oil and a viscosity of the lube oil.

2. The powertrain according to claim 1, wherein the transmission device comprises an input shaft, an output shaft, a gear set, and a shifting mechanism, the input shaft is configured to connect to the drive motor, the output shaft is configured to connect to the wheel, and the shifting mechanism is configured to disconnect a transmission connection between the output shaft and the gear set, and to disconnect a transmission connection between the transmission device and the wheel.

3. The powertrain according to claim 1, wherein, when information indicates that the temperature of the lube oil is less than or equal to a preset temperature value or the viscosity of the lube oil is greater than or equal to a preset viscosity value, the transmission device disconnects the transmission connection between the drive motor and the wheel.

4. The powertrain according to claim 3, wherein, when the information indicates that the temperature of the lube oil is less than or equal to the preset temperature value or the viscosity of the lube oil is greater than or equal to the preset viscosity value, the transmission device disconnects the transmission connection between the transmission device and the wheel.

5. The powertrain according to claim 3, wherein the powertrain comprises an oil pump motor, the oil pump motor is configured to drive a lube oil pump, and when the information indicates that the temperature of the lube oil is less than or equal to the preset temperature value or the viscosity of the lube oil is greater than or equal to the preset viscosity value, the oil pump motor runs in a locked-rotor state.

6. The powertrain according to claim 1, wherein a rotational speed of the drive motor decreases as the temperature of the lube oil rises, or the rotational speed of the drive motor decreases as the viscosity of the lube oil decreases.

7. A control apparatus for an electric vehicle, wherein the electric vehicle comprises a drive motor, a transmission device, and a motor control unit, the drive motor drives a wheel of the electric vehicle through the transmission device, a transmission structure of the drive motor and a transmission structure of the transmission device are lubricated by using a lube oil, the motor control unit comprises a power module, the power module is configured to output a drive current to the drive motor, and the control apparatus is configured to:

send a control signal, based on a result of a comparison between a lube oil parameter value and a preset parameter value, to control the transmission device to disconnect a transmission connection between the drive motor and the wheel, and control the power module to output the drive current to the drive motor, to rotate a rotor of the drive motor.

8. The control apparatus according to claim 7, wherein the control apparatus is further configured to:

when information indicates that a temperature of the lube oil is less than or equal to a preset temperature value or a viscosity of the lube oil is greater than or equal to a preset viscosity value, control the transmission device to disconnect the transmission connection between the drive motor and the wheel.

9. The control apparatus according to claim 8, wherein the control apparatus is further configured to:

in response to the information indicating that the temperature of the lube oil is less than or equal to the preset temperature value or the viscosity of the lube oil is greater than or equal to the preset viscosity value, control the transmission device to disconnect a transmission connection between the transmission device and the wheel.

10. The control apparatus according to claim 8, wherein the electric vehicle comprises an oil pump motor configured to drive a lube oil pump, and the control apparatus is further configured to:

when the information indicates that the temperature of the lube oil is less than or equal to the preset temperature value or the viscosity of the lube oil is greater than or equal to the preset viscosity value, output a control signal, to control the oil pump motor to enable a rotational speed of the oil pump motor to be zero and a torque of the oil pump motor to be greater than zero.

11. The control apparatus according to claim 8, wherein the control apparatus is further configured to:

when the information indicates that the temperature of the lube oil is greater than or equal to the first preset temperature value, control the power module to output a high-frequency impulse current.

12. The control apparatus according to claim 7, wherein the control apparatus is further configured to:

control a voltage of the drive current to decrease as the temperature of the lube oil rises, or control the voltage of the drive current to decrease as the viscosity of the lube oil decreases.

13. The control apparatus according to claim 7, wherein the control apparatus is further configured to:

when information indicates that the temperature of the lube oil is greater than or equal to a first preset temperature value, output a control signal to the power module, to control a torque current of the drive current to be zero and an excitation current to be greater than zero.

14. A motor control unit for a control apparatus of an electric vehicle, wherein the electric vehicle comprises a drive motor and a transmission device, the drive motor drives a wheel of the electric vehicle through the transmission device, a transmission structure of the drive motor and a transmission structure of the transmission device are lubricated by using a lube oil, the motor control unit comprises a power module, the power module is configured to output a drive current to the drive motor, and the control apparatus is configured to:

send a control signal, based on a result of a comparison between a lube oil parameter value and a preset parameter value, to control the transmission device to disconnect a transmission connection between the drive motor and the wheel, and control the power module to output the drive current to the drive motor, to rotate a rotor of the drive motor.

15. The motor control unit according to claim 14, wherein the control apparatus is further configured to:

when information indicates that a temperature of the lube oil is less than or equal to a preset temperature value or a viscosity of the lube oil is greater than or equal to a preset viscosity value, control the transmission device to disconnect the transmission connection between the drive motor and the wheel.

16. The motor control unit according to claim 15, wherein the control apparatus is configured to control a voltage of the drive current to decrease as the temperature of the lube oil rises, or control the voltage of the drive current to decrease as the viscosity of the lube oil decreases.

17. The motor control unit according to claim 15, wherein the control apparatus is further configured to:

when the information indicates that the temperature of the lube oil is less than or equal to the preset temperature value or the viscosity of the lube oil is greater than or equal to the preset viscosity value, control the transmission device to disconnect a transmission connection between the transmission device and the wheel.

18. The motor control unit according to claim 15, wherein the electric vehicle comprises an oil pump motor configured to drive a lube oil pump, and the control apparatus is further configured to:

when the information indicates that the temperature of the lube oil is less than or equal to the preset temperature value or the viscosity of the lube oil is greater than or equal to the preset viscosity value, output a control signal, to control the oil pump motor to enable a rotational speed of the oil pump motor to be zero and a torque of the oil pump motor to be greater than zero.

19. The motor control unit according to claim 15, wherein the control apparatus is further configured to:

when information indicates that the temperature of the lube oil is greater than or equal to a first preset temperature value, output a control signal to the power module, to control a torque current of the drive current to be zero and an excitation current to be greater than zero.

20. The motor control unit according to claim 15, wherein the control apparatus is further configured to:

when the information indicates that the temperature of the lube oil is greater than or equal to the first preset temperature value, control the power module to output a high-frequency impulse current.

\* \* \* \* \*